United States Patent [19]
Radcliffe et al.

[11] Patent Number: 6,011,515
[45] Date of Patent: Jan. 4, 2000

[54] SYSTEM FOR MEASURING AVERAGE SPEED AND TRAFFIC VOLUME ON A ROADWAY

[75] Inventors: Scott T. Radcliffe, Elkridge, Md.; Eric D. Holm, Monument, Colo.

[73] Assignee: The Johns Hopkins University, Baltimore, Md.

[21] Appl. No.: 08/944,798

[22] Filed: Oct. 6, 1997

Related U.S. Application Data

[60] Provisional application No. 60/027,195, Oct. 8, 1996.

[51] Int. Cl.[7] ....................................................... G01S 3/02
[52] U.S. Cl. .......................... 342/453; 342/454; 342/461; 340/936; 701/119
[58] Field of Search ..................................... 342/453, 454, 342/461, 69; 340/936, 933, 910; 701/117, 119

[56] References Cited

U.S. PATENT DOCUMENTS

| | | | |
|---|---|---|---|
| 4,258,351 | 3/1981 | Shigeta et al. | 340/38 P |
| 4,985,705 | 1/1991 | Stammler | 342/69 |
| 5,402,117 | 3/1995 | Zijderhand | 340/905 |
| 5,402,346 | 3/1995 | Lion et al. | 364/436 |
| 5,764,163 | 6/1998 | Waldman et al. | 340/934 |

*Primary Examiner*—Thomas H. Tarcza
*Assistant Examiner*—Dao L. Phan
*Attorney, Agent, or Firm*—Eugene J. Pawlikowski; Carla Magda Krivak

[57] ABSTRACT

A vehicular traffic sensor capable of measuring traffic speed and volume in all weather conditions and at a low installed cost. The sensor makes use of multi-path interference of ambient radio frequency (RF) signals. The ambient RF signals can be, for example, control signals constantly transmitted by cellular telephone base stations. As vehicles travel along the roadway, they reflect RF signals in all directions. An antenna mounted near the side of the road will detect signals from the transmitter and signals reflected off the vehicle. Variations in the amplitude of the combination of the two signals can be processed using a method that allows the sensor to determine traffic speed and volume. This information can then be sent directly to a traffic management center. This provides an inexpensive sensor for wide-area traffic monitoring.

10 Claims, 21 Drawing Sheets

Figure 11A
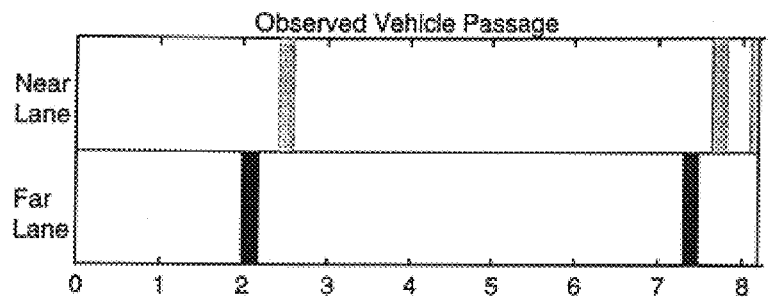
Figure 11B
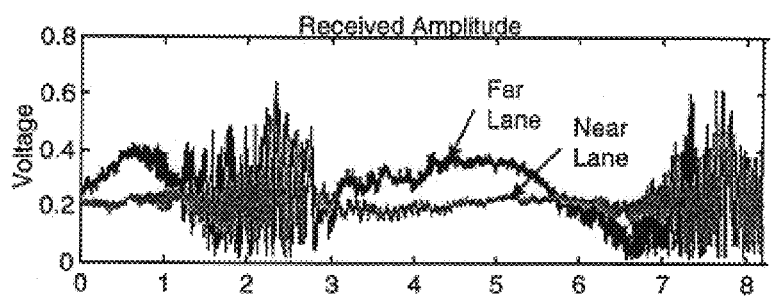
Figure 11C
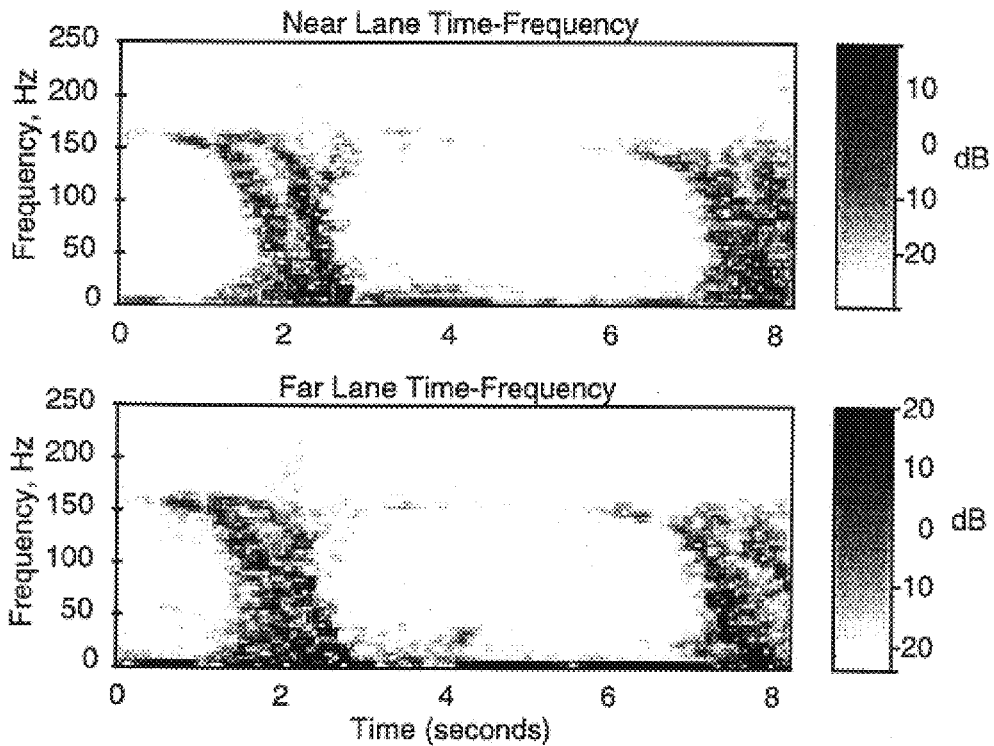
Figure 11D Figure 12A
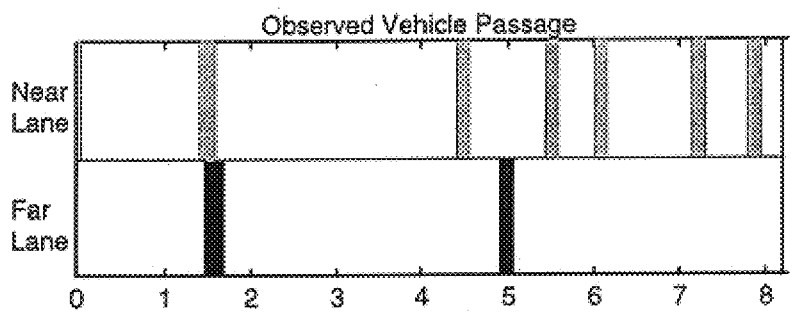
Figure 12B
Figure 12C
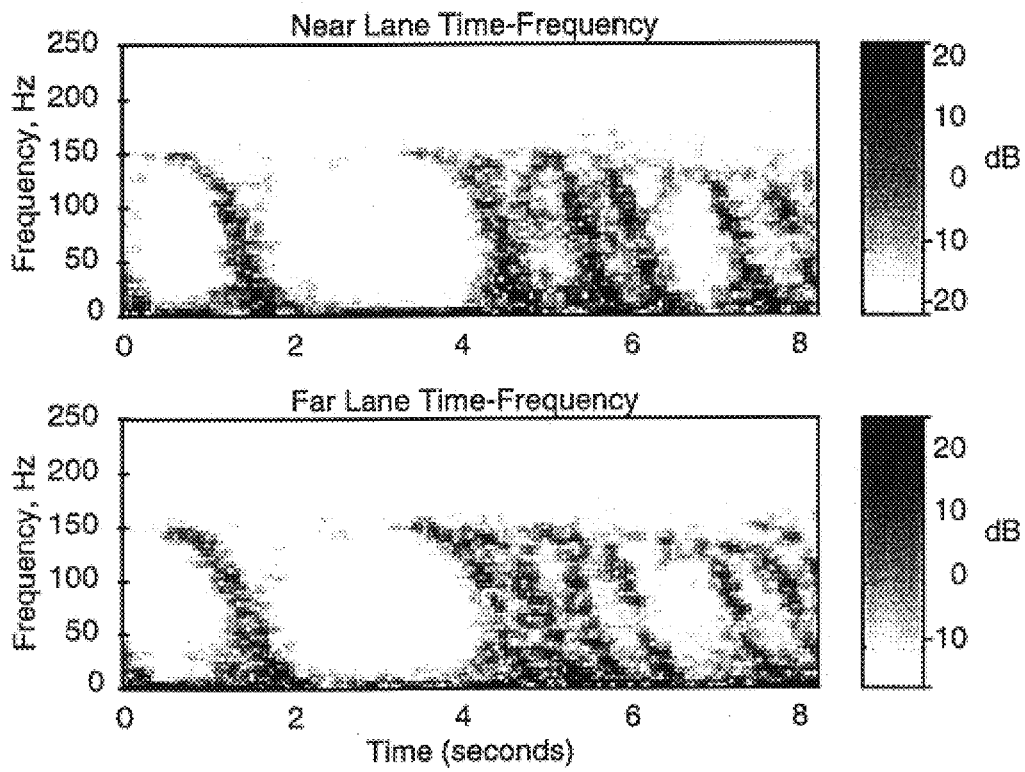
Figure 12D

SYSTEM FOR MEASURING AVERAGE SPEED AND TRAFFIC VOLUME ON A ROADWAY

RELATIONSHIP TO OTHER APPLICATIONS

This application claims the benefit of U.S. prior application Ser. No. 60/027,195, filed Oct. 8, 1996.

STATEMENT OF GOVERNMENTAL INTEREST

The Government has rights in this invention pursuant to Contract No. N00039-95-C-0002 awarded by the Department of the Navy.

BACKGROUND OF THE INVENTION

1. Field of the Invention

This invention relates generally to a device and method to monitor vehicle traffic speed and volume and more specifically to a device and method that detects and uses variations in ambient radio frequency (RF) energy to passively monitor vehicle traffic speed and volume.

2. Discussion of the Related Art

The United States Department of Transportation has sponsored the Intelligent Transportation Systems (ITS) program as part of a major effort underway to improve the nation's transportation system using advanced technology rather than simply adding to the number of roads presently in existence. The National Program Plan for ITS currently identifies twenty-eight user services that form the basis of ITS in efforts and funding. Six of these user services require speed and traffic density information for all major roads in a defined area. Installing traffic speed and density sensors along all major roadways in a metropolitan area understandably constitutes a major expense which would be prohibitive unless inexpensive, reliable and easily serviceable sensors are used.

Many types of traffic sensors have been proposed and tested with varying degrees of success. Currently, two of the most popular technologies for vehicle detection are inductor loops and video cameras. Both, however, are expensive approaches to traffic sensing. Inductive loops are attractive because of their simplicity but their high installation and maintenance costs make them a poor choice for large scale use. Most cities in the United States which employ loop sensors in the traffic management program report that approximately 25–30% of the sensors in the system are operating improperly at any one time. Automatic traffic detection using video cameras is a flexible approach that can be applied to intersections on multi-lane highways except that dependence on video cameras is a complex and costly operation. The cost to instrument a 4-way intersection using either loops or cameras is estimated to be $25,000.00. Providing instruments at a multi-lane section of highway would require approximately the same level of expense Most of the ITS user services require an up-to-the-minute knowledge of traffic conditions over a wide metropolitan area. Traffic sensors will need to cover all major roads in order to provide information for incident management, pre-trip travel information, en-route driver information, route guidance, traffic control, and emergency vehicle management. The wide-spread installation of traffic sensors on major roads will enable recurring and non-recurring congestion to be detected, monitored, reported, and managed. Delays can be minimized and travelers can adjust travel based on expected delays. For example, the location of an incident can be immediately determined by an abrupt decrease in speed that occurs at an incident. Rescue vehicles and tow trucks can be immediately dispatched to the correct location. The effect of the incident can be monitored by observing the extent of the congestion, the traffic flow approaching and leaving the area, and the speed reductions that occur. Predictions of total traffic congestion and delays for the next several hours can be made based on the traffic measurements, expected traffic flow, time estimates for clearing the incident and traffic models. Travelers can then adjust their immediate travel plans based on the current situation, and make future plans based on normal delays. The ease of measuring traffic patterns will make planning more effective and accurate. All of this will have the effect of reducing the economic, social, and environmental costs associated with recurring and non-recurring congestion.

There are many different types of traffic sensors available. There are also different requirements for traffic sensors based on where they will be installed and how they will be used. For example, sensors used for signal control need to be very accurate at detecting the presence of vehicles but may not need to measure speed. Sensors used for wide area incident detection need to give an approximate measure of speed and traffic volume at a very low installed cost. Inductive loops are commonly used for detecting vehicle presence but the cost and dangers associated with installing loops as well as their high maintenance cost make them unacceptable for wide area traffic monitoring.

An additional factor when looking at the cost of a sensor is the cost of supplying power and communications to the sensor. These two items can be the main cost in installing a sensor. It is therefore desired to have a sensor that requires only a small amount of power that can run on solar/battery power, eliminating the need for additional power lines. Communications for the sensor can be provided by a wireless network of some sort, assuming the sensor only reports occasionally and when an anomalous condition is detected. Considering the total cost of installation, a low power sensor with wireless communications can be significantly less expensive than other sensors.

SUMMARY OF THE INVENTION

It is an object of the present invention to provide a low power traffic sensor.

It is another object of the present invention to provide a device and method to passively measure traffic volume and average speed.

It is yet another object of the present invention to provide a traffic sensor which can be manufactured, installed and maintained at a reasonably low cost.

It is a further object of the present invention to provide a device and method to passively measure traffic volume and speed, making use of multi-path induced variations in ambient radio frequency energy in the area of the sensor.

Although many types of traffic sensors are currently available, the sensor of the present invention offers a unique combination of advantages. It can be installed on the side of the roadway and does not require any modification to the road surface. Thus, installation and maintenance problems associated with pavement-based sensors are eliminated. It is unaffected by weather conditions. The individual unit cost is low. Because the traffic sensor is passive, it can operate on solar/battery power and thus reduces the cost of installation in areas where power is not readily available. Wireless communications can also eliminate the need for communications cables further reducing the cost of installation.

The features of the present invention include a constant amplitude signal source, a vehicle and a sensor. The sensor includes an antenna, receiver, analog-to-digital (A/D) converter and processing means for processing signals from the A/D converter. The receiver is preferably an AM receiver. The constant amplitude signal is an RF signal. The transmitter can be a cellular telephone base station, a TV station, a radio station or other type of station that outputs constant amplitude signals. The antenna can be a directional antenna.

A method according to the present invention includes reflecting a constant amplitude signal from a source off a vehicle, receiving, by the sensor, the constant amplitude signal and the reflected signal, determining the speed and traffic volume using the reflected signal and the constant amplitude signal, and forwarding the results to a management center. The speed of the traffic is determined by determining the rate of multi-path fluctuation. The vehicles are detected by determining the amplitude of fluctuation, setting vehicle detection thresholds, comparing the amplitude of fluctuation with the vehicle detection thresholds and incrementing a vehicle count each time the vehicle detection thresholds are exceeded.

As automobiles travel along the highways signals from a constant amplitude source reflect off automobiles and are picked up by a receiver (sensor) placed at roadside. The receiver not only receives the reflected signals but it also receives a direct signal from the transmitter site. Therefore, the amplitude of the receiver waveform combination depends on the relative phasing and amplitudes of the direct and reflected signals.

Because the vehicles are in motion, the amplitude of the received signal will vary according to a phenomena called multi-path fading. The velocity of the car and the relative locations of the transmitter (constant amplitude source) and receiver (sensor) determine the rate at which fading occurs. The passage of vehicles can be determined from the magnitude of the fading and the vehicle speed can be determined from the rate of the fading.

The Passive Multi-path Traffic Sensor of the present invention exploits multi-path interference from constant amplitude RF signals that are present in the environment all the time. The radio signals are reflected off vehicles as they travel along a highway. The sensor uses existing transmitters for a signal source and multi-path interference as a means of Doppler estimation. The sensor's antenna can be placed alongside a road and will pick up direct signals from the transmitted and reflected signals from the vehicles. The amplitude of the combined waveform can be large or small depending on the relative phasing and amplitude of the direct and reflected signals. When the two signals are in phase, the resulting signal will be larger. When the two signals are out of phase, the resulting signal will be smaller. This phenomena is called multipath fading. If the relative phase between the two signals varies with time, the amplitude of the resulting signal will also vary. If the signal being monitored is generated using a constantamplitude modulation (such as frequency or phase modulation), then the amplitude variations are almost entirely caused by multi-path fluctuations.

These objects, together with other objects and advantages which will be subsequently apparent, reside in the details of construction and operation as more fully described and claimed hereinafter, reference being had to the accompanying drawings forming a part hereof, wherein like reference numerals refer to like parts throughout.

BRIEF DESCRIPTION OF THE DRAWINGS

FIGS. 11A–11D, 12A–12D, and 13A–13D each show eight-second long data sets;

DESCRIPTION OF THE PREFERRED EMBODIMENTS

Figure 1:
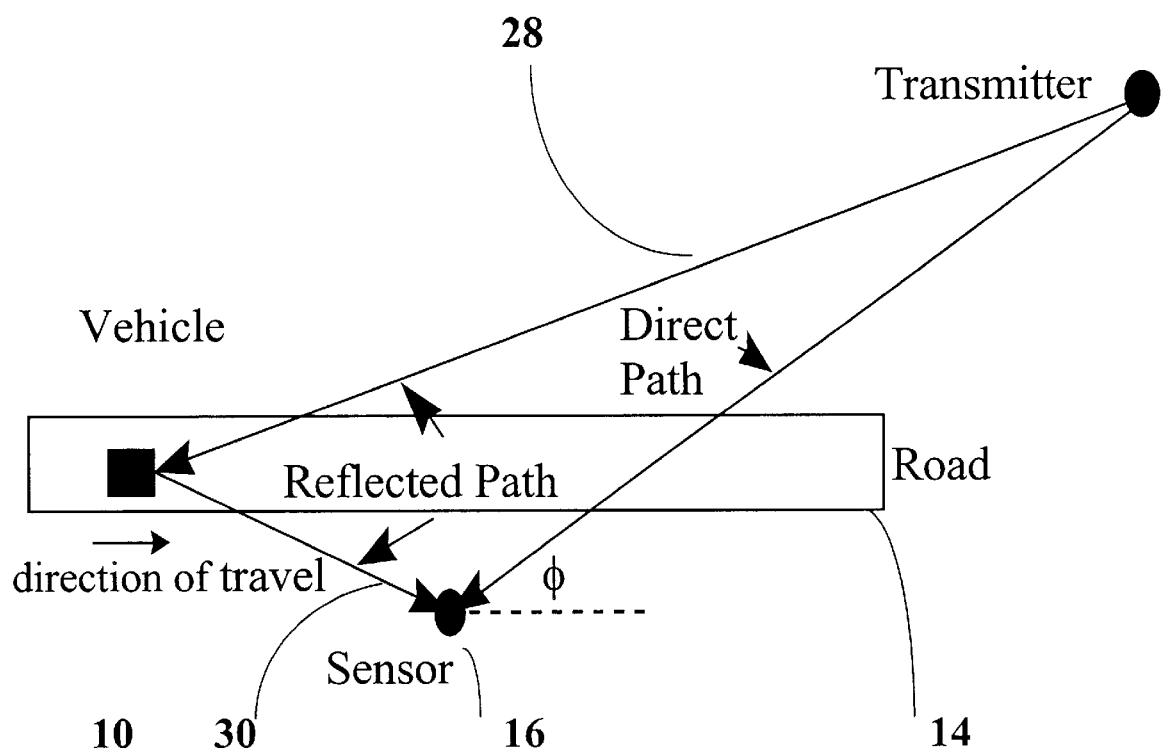
FIG. 1 is a top view of a traffic scene showing the relative locations of the three principle elements of a preferred embodiment of the invention.

FIG. 1 of the drawings shows the main elements, signal paths, and relative geometry according to a preferred embodiment of the present invention. FIG. 1 is a top view looking down on a roadway 14. A vehicle 10 is traveling along the roadway 14. The vehicle 10 may be traveling in either direction, but for this description the vehicle 10 will be assumed to be traveling from left to right. Only one vehicle 10 is shown for simplicity. The sensor 16 is shown on the side of the road 14. The preferred embodiment has the sensor 16 as close to the road 14 as practical. The sensor can be located above the roadway 14, but this is usually less desirable because of increased installation and maintenance costs. A transmitter 12 can be located anywhere. A preferred transmitter 12 is a cellular telephone base station, although other types of transmitters can be used. Other types of transmitters that can be used include TV signals, radio signals, or any other type of signal that has a constant amplitude. The advantage to using a cellular signal is that the bay station transmits 24 hours a day, 365 days a year. Additionally, call boxes, such as those manufactured by GTE, can also be used since they are compact and include built in antennae.

The angle $\phi$ is defined as the angle between a line connecting the sensor 16 and the transmitter 12 and a line extending from the sensor 16 and parallel to the roadway 14. The angle $\phi$ is small when the transmitter 12 is near the roadway 14 and in front of the vehicle 10. The direct path 18 is the shortest path the radio signal takes from the transmitter 12 to an antenna in the sensor 16. Obstructions can be present in the path 18 as long as they do not significantly attenuate the signal. The reflected path consists of two parts 28 and 30. The first part 28 is the shortest path the radio signal takes from the transmitter 12 to the vehicle 10. This path will generally encounter the same attenuation that the direct path 18 encounters. A portion of this signal will be reflected off the vehicle 10 and toward the sensor 16, generating the second part of the reflected path 30 which is the path from the vehicle 10 to the sensor 16. The sensor 16 should be located such that there are no obstructions to the path 30 when the vehicle 10 is near the sensor 16.

An antenna in the sensor 16 picks up signals that travel along both the direct path 18 and the reflected path 28 and 30. The amplitude of the combined waveform can be large or small depending on the relative phasing and amplitude of the direct and reflected signals. When the two signals are in phase, the resulting signal will be larger than the individual signals. When the two signals are out of phase, the resulting signal will be smaller than the individual signals. As mentioned above, this phenomenon is called multi-path fading.

Signals reflected off a moving vehicle experience a Doppler shift due to the motion of the vehicle. Because a Doppler shift is a change in frequency, the relative phases between the direct signals 18 and the reflected signals 28 and 30 are constantly changing, causing an amplitude modulation (AM) of the combined signals. The magnitude of the Doppler shift depends on the speed of the vehicle 10 speed and the relative geometry of the transmitter 12, vehicle 10, and the antenna in the sensor 16. Because the relative geometry is changing as the vehicle 10 moves past the antenna in the sensor 16, the Doppler shift and resulting amplitude modulation will also vary. This is similar to the high-to-low frequency shift we hear as a vehicle drives past.

Figure 2:
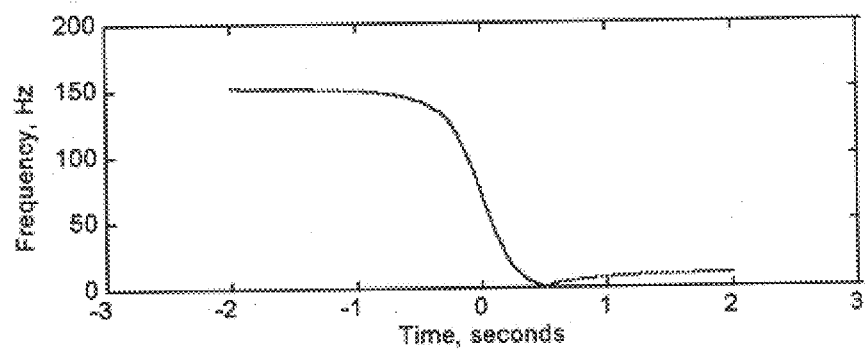
FIG. 2 shows a time versus frequency plot of theoretical frequency variations from a vehicle passing the sensor.

FIG. 2 shows the frequency of the amplitude modulation as a vehicle 10 passes the sensor 16 for an angle φ of 30°. It is important to note that the sensor 16 does not require the vehicle 10 to transmit anything. Thus, the system is a passive system. However, because of this, constructive and destructive interference must be used because information regarding the transmitted signal is unknown. The angle φ can be determined by either knowing the geometries involved or by measuring the approaching and departing frequencies from a single vehicle. Once φ is known, vehicle speeds can be determined by simply measuring the maximum frequency. The passage of vehicles can be determined by observing the frequency transition.

Figure 3:
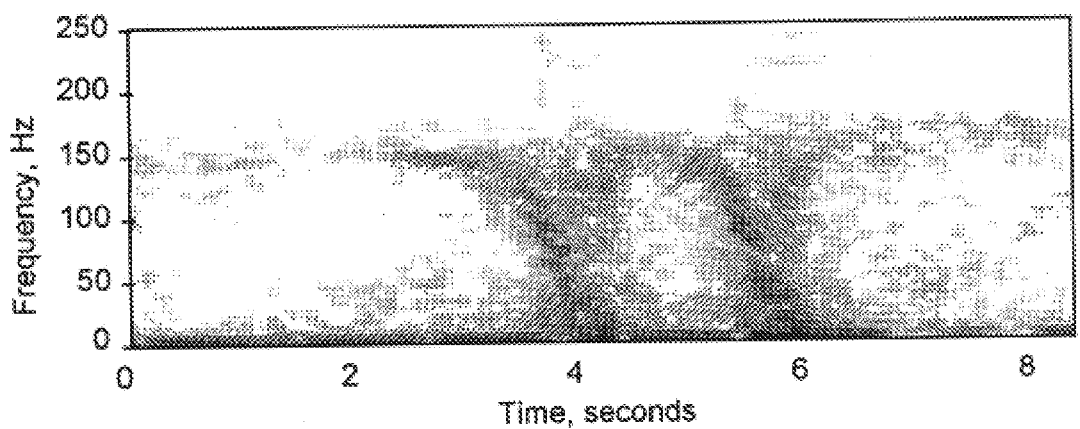
FIG. 3 shows a time versus frequency plot of measured frequency variations from two vehicles passing the sensor.

FIG. 3 is a time-frequency plot for several seconds of real data (small φ)clearly showing the passage of two vehicles.

Figure 4:
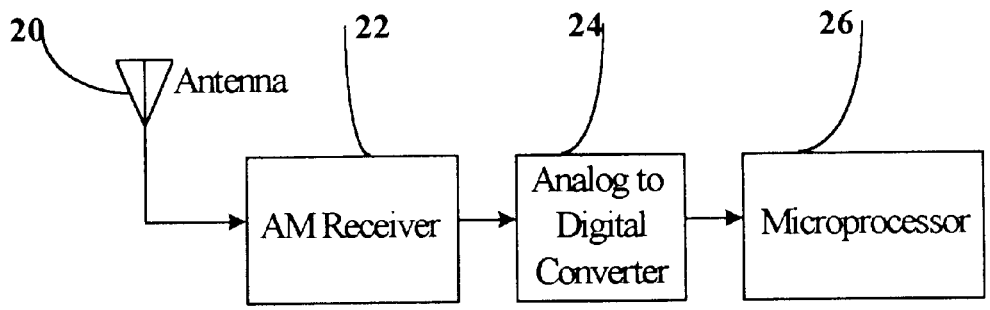
FIG. 4 shows a block diagram of the elements of the sensor shown in FIG. 1.

FIG. 4 shows the minimum components that make up the sensor 16. The components include an antenna 20, an AM receiver 22, an analog to digital converter 24, and a microprocessor 26. The detected amplitude of the cellular control signal should be digitized at a rate more than twice the highest Doppler expected and fed to the microprocessor 26 where the traffic parameters are calculated. The traffic parameters can be stored and downloaded at a later time or sent to a traffic management center.

The signals chosen for use are control signals emitted by the transmitter 12 such as cellular telephone base stations, although other signals could be used. Cellular coverage is quite good over all major roads in the U.S. and the cellular control signals are emitted 24 hours a day, whether someone is using the cellular system or not. The suggested frequency band (880 MHz) is useful because the ~⅓ meter wavelength provides sufficient spatial resolution and Doppler variations. However, since the cell frequency of the cellular telephone base stations change, the sensor 16 will search and determine the frequency of the transmitter 12 during off hours. The audio portion of UHF television could also be used with similar results, providing a station in the area is on 24 hours a day.

The sensor 16 in the preferred embodiment operates at low power because a transmitter in the sensor 16 is not required.

Multi-path interference will now be discussed. When two or more waves add, the phenomenon of multi-path interference occurs. The individual strengths and relative phases determine the strength of the resulting signal. When the signals are in phase, constructive interference occurs and the resulting signal is larger than the components. When the signals are out of phase, destructive interference occurs and the resulting signal is weaker. When two signals combine and are of slightly different frequencies, then the relative phase will be constantly changing and the resulting signal will experience an amplitude modulation. The fundamental frequency of the amplitude modulation will be equal to the frequency difference between the two waves. For the Multi-path Traffic Sensor, the frequency difference results from the Doppler shift of the reflected wave. This provides a low power, low cost system that is capable of measuring speed and counting vehicles and is unaffected by weather. A comparison between the passive Multi-path Traffic Sensor with other sensors is shown below in Table 1.

TABLE 1

Non-intrusive Sensors

| Sensor Type | Measure Speed | Count Vehicles | Affected by Weather | Low Power | Cost |
| --- | --- | --- | --- | --- | --- |
| Passive Acoustic | No | Yes | Yes | Yes | Low |
| Doppler Ultra-sonic | Yes | Yes | Yes | No | Med |
| Pulsed Ultra-sonic | No | Yes | Yes | No | Med |
| Doppler Radar | Yes | Yes | No | No | Low |
| Pulsed Radar | Yes | Yes | No | No | Med |
| Video Imaging | Yes | Yes | Yes | No | Med/High |
| Passive IR | No | Yes | Yes | Yes | Low |
| Active IR | Yes | Yes | Yes | No | Med |
| Passive Multi-path | Yes | Yes | No | Yes | Low |

Figure 5A:
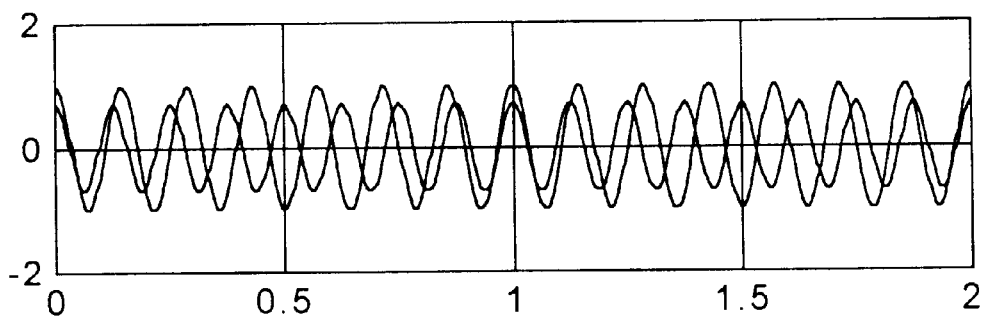
FIG. 5A and 5B are waveform diagrams of two cosine waves that are offset by 1 Hz.
Figure 5B:
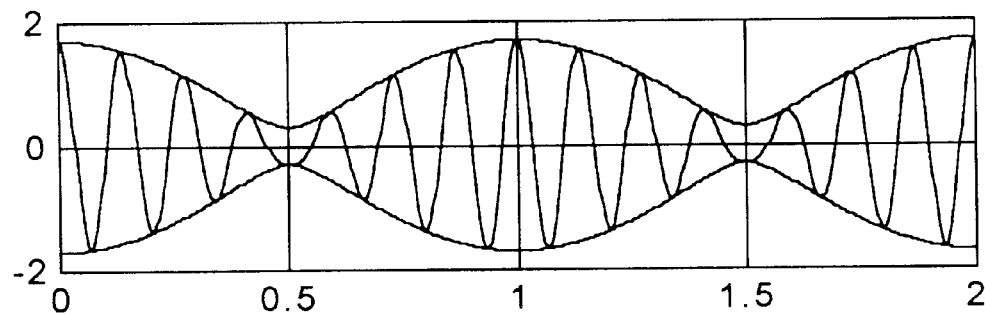

FIGS. 5A and 5B are waveform diagrams of two cosine waves that are offset by 1 Hz. The waveform diagram in FIG. 5A shows the individual waves, which have slightly different amplitudes. The waveform diagram in FIG. 5B shows the sum of the two waves and the resulting amplitude modulation. The effect of constructive and destructive interference can be seen quite easily. The amplitude modulation is the square-root of a 1 Hz cosine wave with appropriate amplitude and offset. The Doppler (without harmonics) is thus determined by squaring the amplitude modulation.

For the Multi-path Traffic Sensor, the amplitude of the direct wave 18 is relatively constant, although there is usually some fluctuation caused by unwanted multi-path signals or variable attenuation if the direct signal 18 passes through foliage that moves with the wind, etc. However, the amplitude of the reflected wave 28 and 30 varies considerably. The first cause of these variations is a change in a bi-static radar cross section of the vehicle 10 as the vehicle 10 passes the sensor 16. The bi-static radar cross section of the vehicle 10 is not constant. Bi-static refers to two stationery objects that are not coherent. Only the constant amplitude is known, the transmitter signal is not known. In the present invention the transmitter 12 and the receiver are bi-static because they are in different locations. A second cause is the effect of the antenna pattern of the sensor 16. The result is that the amplitude modulation will vary considerably in magnitude as the vehicle 10 passes. To maximize the multi-path generated amplitude modulation, the direct and reflected amplitudes should be similar. This can be somewhat controlled by the choice of the antenna pattern for the sensor 16.

The equations used will now be discussed.

The Doppler shift experienced by a radio signal is given by $$Doppler = \frac{1}{\lambda} \cdot \frac{d\,(signalpath)}{dt}$$

where $\lambda$ is the wavelength.

Referring again to FIG. 1, there is no Doppler shift for the direct path 18 since there is no relative motion. The Doppler shift for the reflected path 28 and 30 is the sum of the Doppler shifts experienced on each leg of the path. The Doppler shift is separately calculated for each leg of the reflected path 28 and 30 and then added to obtain the total Doppler. Because the sensor 16 is detecting multi-path interference between the two paths, only the magnitude (not sign) of the resulting Doppler is detected.

Figure 6:
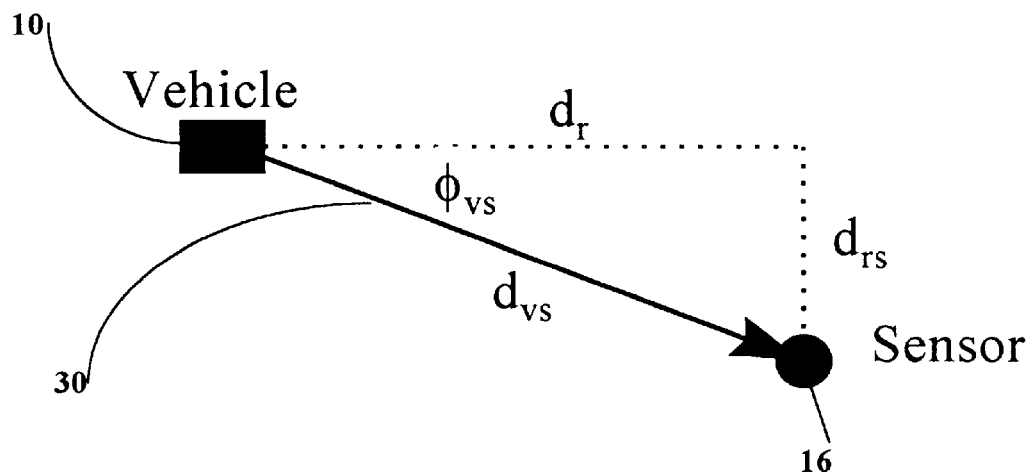
FIG. 6 describes a reflected signal path from the vehicle to the sensor.
Figure 7:
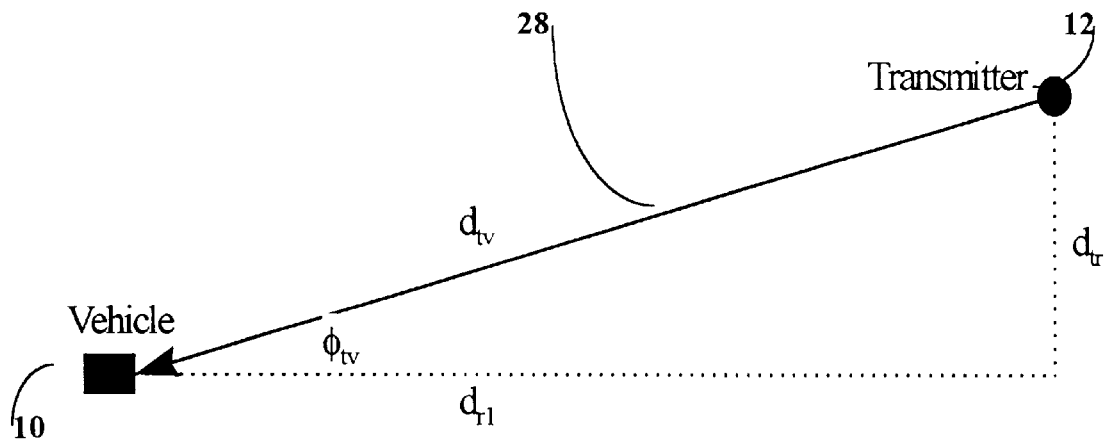
FIG. 7 shows a signal path from the transmitter to the vehicle path.

Let the signal path from the vehicle to the sensor 16 be $d_{vs}$ as shown in FIG. 6. The distances $d_r$ and $d_{rs}$ are the distances along the roadway 14 and the distance from the road 14 to the sensor 16 respectively. Assuming the vehicle 10 is traveling at a constant velocity from left to right, then $d_r = -vt$ where $v$ is the velocity and $t=0$ when the vehicle 10 is in front of the sensor 16. Thus, $$d_{vs} = \sqrt{d_r^2 + d_{rs}^2} = \sqrt{v^2 t^2 + d_{rs}^2}$$

and $$Doppler_{vs} = -\frac{1}{\lambda} \cdot \frac{d}{dt}\left(\sqrt{v^2 t^2 + d_{rs}^2}\right) = -\frac{1}{\lambda} \cdot \frac{v^2 t}{\sqrt{v^2 t^2 + d_{rs}^2}}$$

Following a similar derivation and continuing $$Doppler_{rv} = -\frac{1}{\lambda} \cdot \frac{v^2 t}{\sqrt{v^2 t^2 + d_{tr}^2}} = \frac{v}{\lambda} \cdot \cos(\phi_{rv})$$

If $d_{rv}$ is large relative to the distance the vehicle 10 travels while in the main beam of the antenna, then the angle $\phi_{rv}$ does not change significantly and can be approximated by the constant angle $\phi$ from FIG. 1. The location for $t=0$ is different for this derivation, but since the result is independent of t, the two Doppler signals can be added.

The total Doppler is thus $$Doppler \xrightarrow[t \to \pm\infty]{} \frac{v}{\lambda}(\cos(\phi) \pm 1)$$

Figure 8:
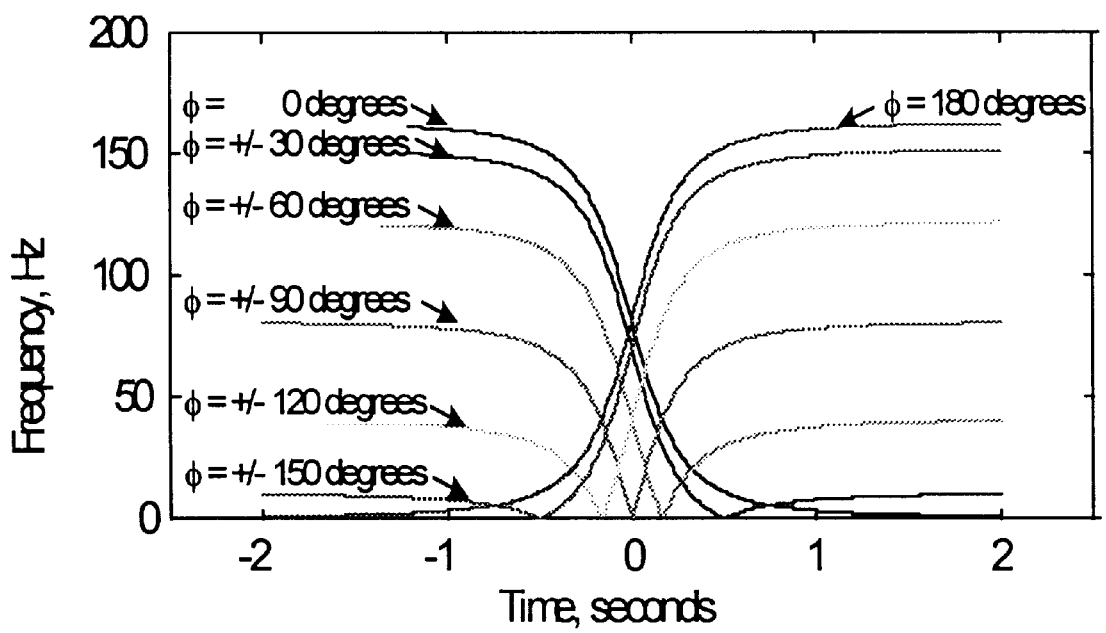
FIG. 8 is a graph for a speed of 100 km/hr, a sensor eight meters from the roadway and various values of $\phi$.

The Multi-path Traffic Sensor sees the absolute value of this. As shown in FIG. 8, when the transmitter 12 is to the right of the sensor 16 (for the orientation shown in FIG. 1), the frequency transition is from a higher frequency, through zero, to a lower frequency. When the transmitter 12 is to the left of the sensor 16, the frequency transition is from a lower frequency, through zero, to a higher frequency. The frequency variations are symmetrical for plus and minus values of $\phi$.

When a vehicle 10 is approaching or leaving the sensor 16, the Doppler approaches a constant value. For large t,+ or −, the Doppler is $$Doppler = \frac{v}{\lambda} \cdot \left(\cos(\phi) - \frac{vt}{\sqrt{v^2 t^2 + d_{rs}^2}}\right) \qquad (1)$$

The absolute value of this can be written as $$|SteadyStateDoppler| = \frac{v}{\lambda}(1 \pm \cos(\phi)) \qquad (2)$$

The two values that this equation provides are the approaching and departing Doppler. During sensor 16 installation or re-initialization, the approaching and departing Doppler for a lone vehicle 10 can be measured (a lone vehicle is necessary to separate approaching and departing values). Since the wavelength is known, these measurements give two equations and two unknowns, n and $\cos(\phi)$, which can be easily solved. Measurements of minimum steady-state Doppler may be rather noisy but repeated measurements of lone vehicles should improve the accuracy of the $\cos(\phi)$ estimate. Once $\cos(\phi)$ is known, the speed can be determined by measuring only the maximum steady state Doppler. Note that $\phi$ does not actually need to be determined, only $\cos(\phi)$.

The total Doppler goes to zero when the Doppler on each leg of the reflected path cancel. From the total Doppler equation we see this occurs when.

$$\cos(\phi) = -\cos(\phi_{vs}).$$

When the sensor 16 and transmitter 12 are on opposite sides of the road 14, the total Doppler goes to zero when the vehicle 10 crosses a line connecting the sensor 16 and the transmitter 12. When the sensor 16 and transmitter 12 are on the same side of the road 14, the total Doppler goes to zero when the vehicle 10 crosses a line connecting the sensor 16 and a mirror image of the transmitter 12 on the opposite side of the road. This again points out that it is $\cos(\phi)$ that is important not $\phi$. As seen in the next section, the zero Doppler point is also when the largest return occurs from the vehicle 10.

Figure 9B:
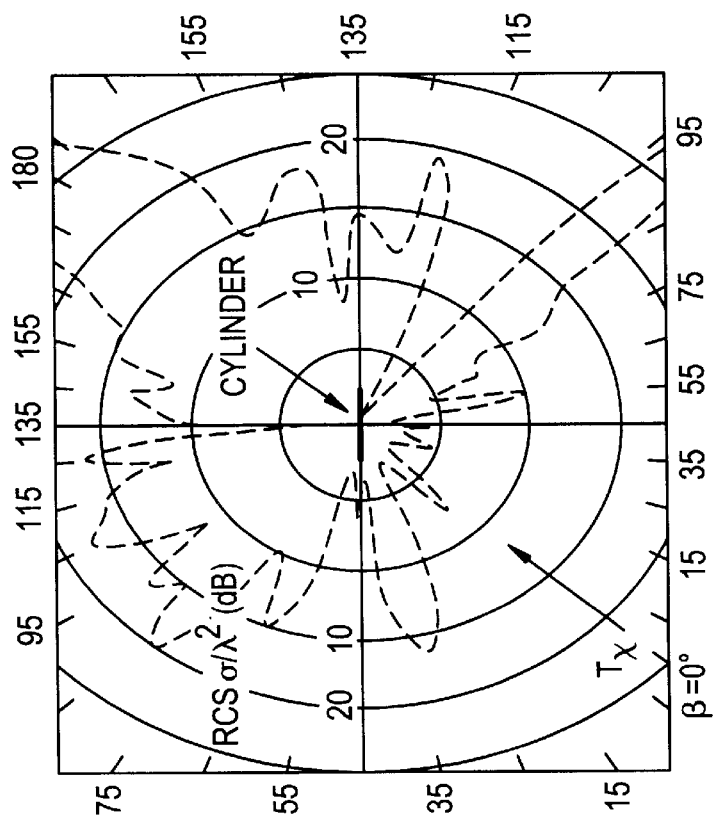
FIGS. 9A, 9B, and 9C show plots of normalized bi-static radar cross sections.
Figure 9A:
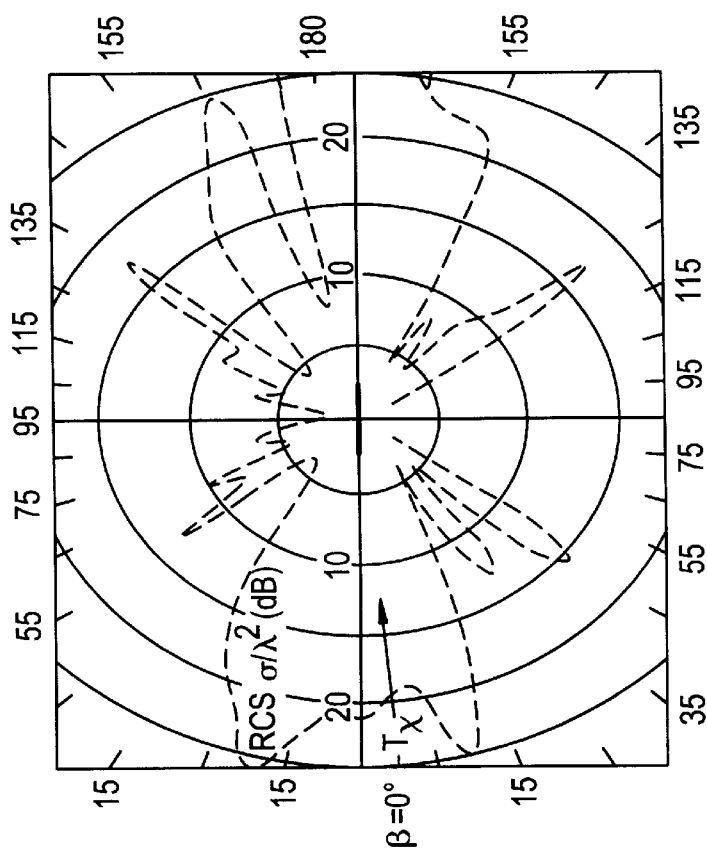
Figure 9C:
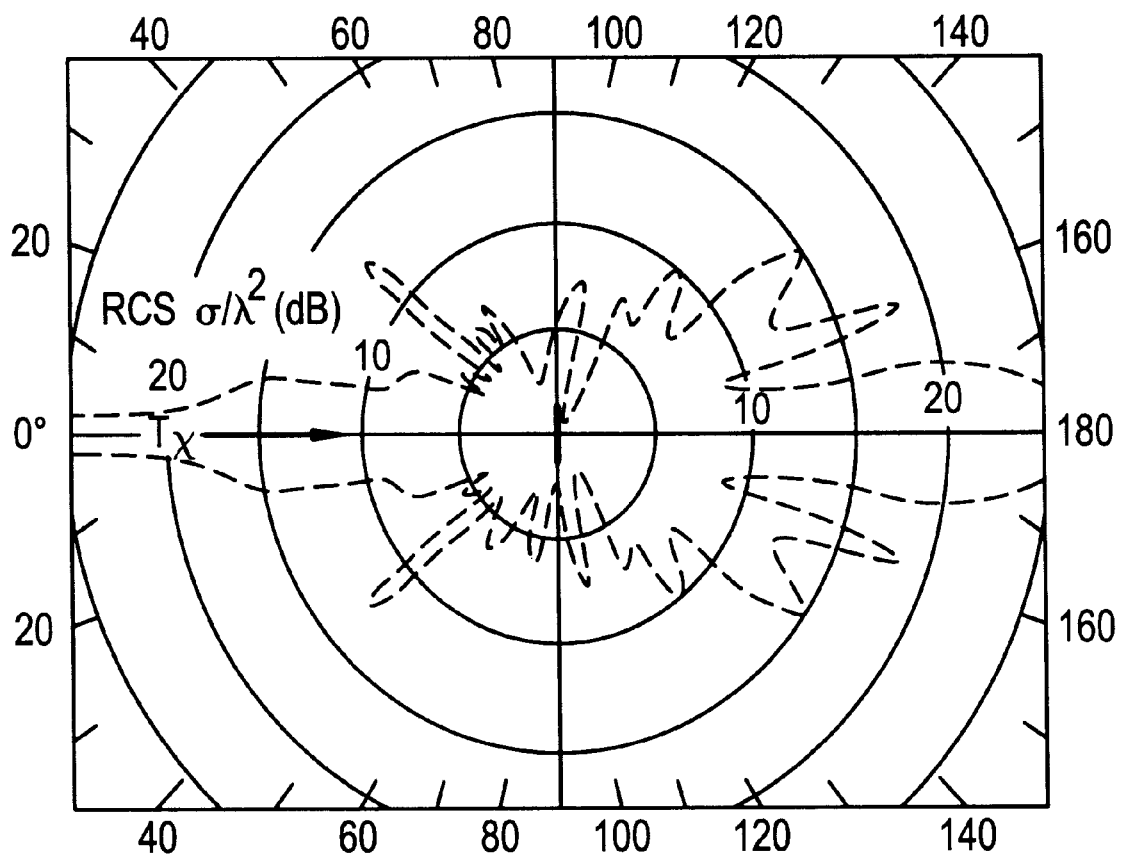

The bi-static radar cross section will now be discussed. The bi-static radar cross section of a cylinder is shown in FIGS. 9A, 9B, and 9C for three fixed transmitter-to-target geometries. If vehicles 10 are modeled as cylinders traveling down the road 14, these diagrams show when the largest returns will occur. The cylinder orientation is seen at the center. The angle of the signal from the transmitter 12 is indicated by the thick arrow where the bi-static angle $\beta$ equals zero. Two large returns can be seen in each case along with a number of smaller returns. One large return is always at 180°. This can be visualized as a reflection off the top of the cylinder (the diagrams are looking down on the cylinder). The other large return is off the side of the cylinder. For FIG. 9A there are two reflections off the sides. One is off the end of the cylinder centered at about $\beta=5°$ and the other is off the long side of the cylinder at about $\beta=170°$ which combines with the 180° return for one large lobe. For FIG. 9B the reflection is at $\beta=90°$ since the orientation is 45°. For FIG. 9C the reflection is at 0° since the orientation is broadside. The angles with strong returns are the same angles where the Doppler goes through zero.

The normalized radar cross sections plotted in FIGS. 9A–9C are for a 16 by 1.85 cm cylinder and a frequency of 35 GHz. Adjusting dimensions and frequency for this case (1.5 m by 0.5 m cylinder to model a hood or fender, 880 MHz, and assuming a 30 dB peak) we find a maximum radar cross section similar to a sphere 2 meters in radius.

The reflected signal 28 and 30 will always be much weaker than the direct signal 18 as they approach the antenna of the sensor 16. Using the approximate radar cross section from the previous section and estimating the sensor 16 to roadway 14 distance at 8 meters, the maximum reflected signal 28 and 30 is estimated to be approximately 18 dB weaker than the direct signal 18. This imbalance in signal strengths can be compensated for by using a directional antenna.

The maximum reflected signal 28 and 30 will generally occur at zero Doppler. Using the antenna pattern, it is desirable to make the maximum reflected signal 28 and 30 from an average vehicle 10 slightly stronger than the direct signal 18 as they enter the receiver. The maximum multi-path amplitude modulation would then occur just prior to and just after zero Doppler. This simplifies the design of the vehicle 10 detection algorithm by allowing only the lower frequencies to be examined.

It is possible that the direct signal 18 is too weak because it is in a very deep antenna pattern null. This may occur on the back side of flat panel antennas. One possible way to alleviate this problem is to add the output from an omni-directional antenna, attenuated by 20 dB or more, to the output of the antenna of the sensor 16. The attenuation can be adjustable by the sensor 16 to allow maximization of the signal modulation.

Figure 10:
FIG. 10 is a photograph of a prototype traffic sensor actually installed along a major artery.

A prototype sensor 16 was installed on the north-bound side of route 29 in Columbia, Md. The installation is shown in FIG. 10 as seen from a pedestrian overpass near the sensor 16. A flat panel antenna was used in a prototype of the sensor 16 and had a gain of 15 dBi for the main lobe. The side lobe gain for the direct path 18 from the base station was not known but was likely several dB below isotropic making the signals similar in amplitude when they reach the receiver. This was verified by observing the collected data which had deep nulls indicating similar signal strengths at the receiver. The angle $\phi$ to the transmitter 12 is 22° which is behind and to the right of the photographer. The "telephone" pole and antennas were installed by the Maryland State Highway Administration. The installation had two channels to separate the near and far lanes of the north-bound traffic. Lane separation was accomplished using the directionality of the antennas. The antenna beamwidths were 65° horizontal (along the lane) and 17° vertical (lane-to-lane) giving tolerable lane separation and allowing the antenna to see vehicles when they were approaching the sensor 16 for measuring the maximum Doppler. The maximum gain of the antennas was 15 dBi. The antenna outputs were amplified and down-converted to an intermediate frequency (IF) in a box mounted on a pole between the antennas. An AM detector, digitizer, and an imbedded computer system were located in a box at the base of the pole. The digitized amplitude modulations were recorded on a removable computer disk and later processed using MATLAB. The signal processing can be done in real-time in the imbedded computer system with the results either recorded or communicated to a traffic management center. Manual push-button switches were used to record when each vehicle 10 passed the sensor 16. In actual operation, however, the switches would switch automatically. Independent speed measurements were not made. However, the algorithms developed for determining the traffic sensor volume and speed were applied to the data. The results showed a volume accuracy over 90% and a speed accuracy better than ±5 mph.

Figure 13A:
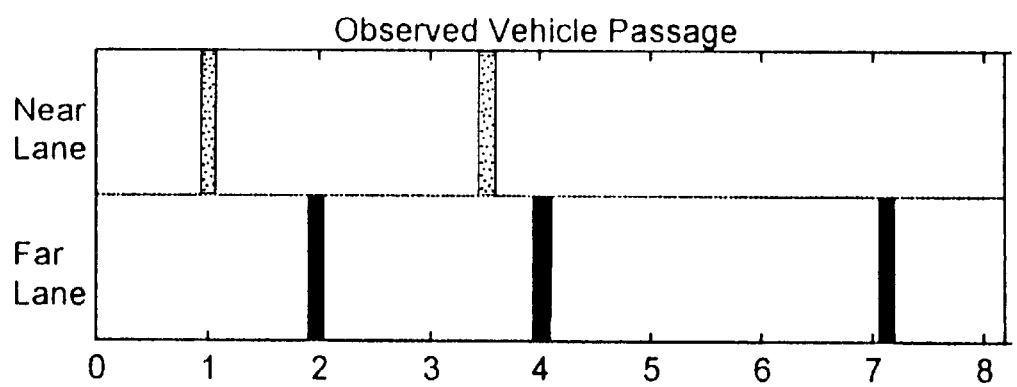
Figure 13B:
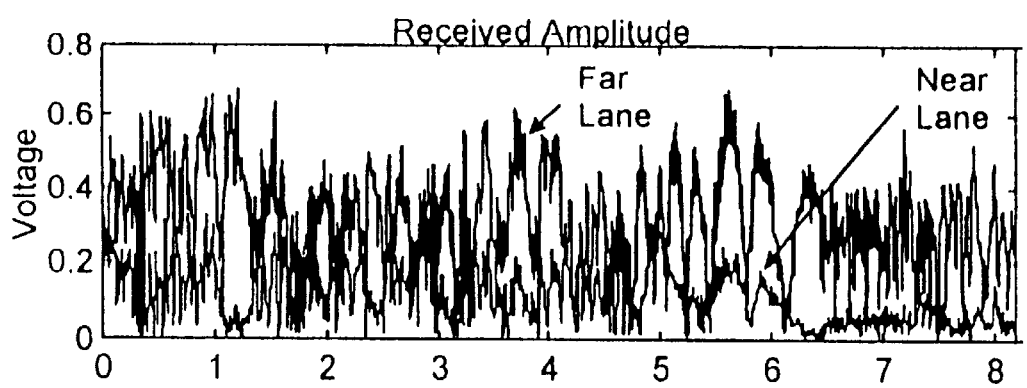
Figures 13C, 13D:
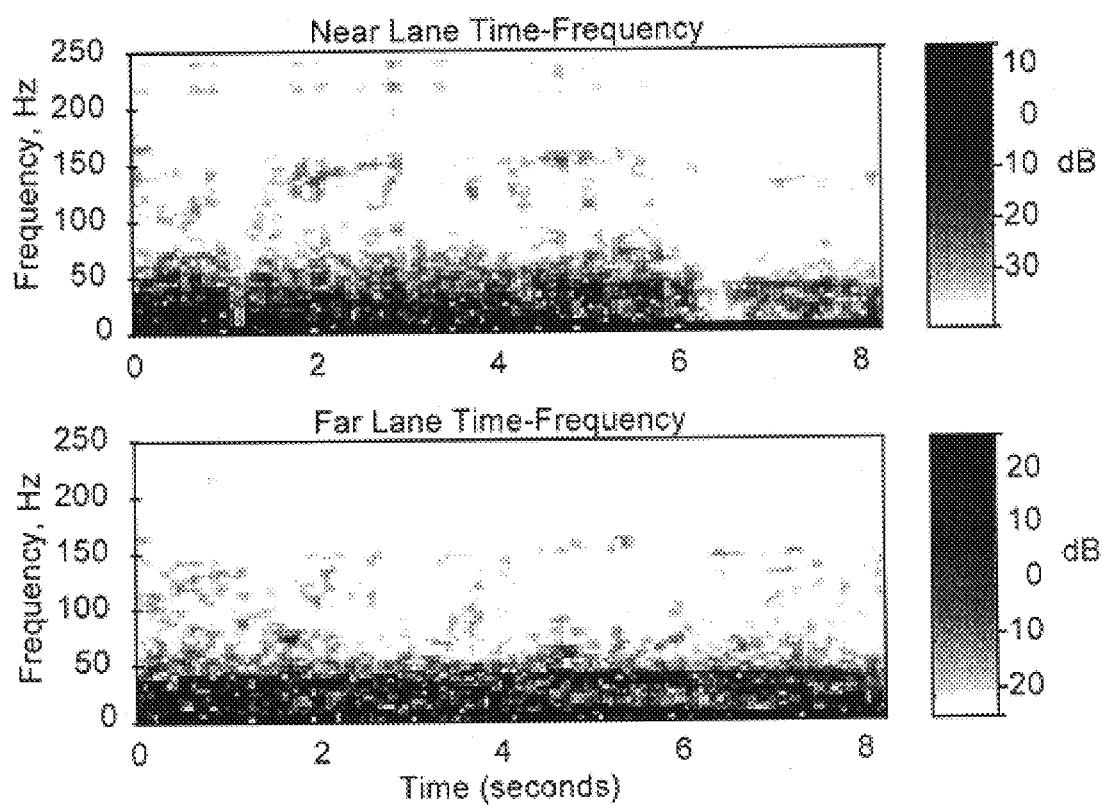

Three representative segments of data will be described in this report. They are each 8 seconds long and are shown in FIGS. 11A–11D, 12A–12D, and 13A–13D. In each figure, the top set of curves are ground-truth data from the push-button switches showing when vehicles passed directly in front of the sensor 16. A value of 1 (a pulse from 0.5 to 1) indicates a vehicle in channel 1 (near lane), while a value of 0 indicates a vehicle in channel 0 (far lane). The set of curves in FIGS. 11B, 12B and 13B show the raw signal amplitudes on a dB scale. The data was sampled at a 1 kHz rate. The lighter curve is for channel 1 while the darker curve is for channel 0. The plots in FIGS. 11C, 11D, 12C, 12D, 13C and 13D show time-frequency data for channel 1 and channel 0 respectively. The time-frequency plots were generated using a sliding Fast Fourier Transform (FFT) and thus show the frequency content of each signal as a function of time. Frequency strength is indicated by shading, with the dark representing a strong signal and the white representing a weak signal. The shading is on a dB scale and is calibrated to the right of the plot.

The traffic speeds for vehicles 10 in FIGS. 11 and 12 were approximately 65 mph. Although the speed limit is 55 mph, speeds are typically higher. A tight train of vehicles 10 is seen in FIG. 12A channel 1. The traffic was backed-up for FIG. 13A and the speeds were much slower, perhaps 8 to 15 mph.

A number of features can be noted in FIGS. 11–13. The increase in amplitude modulation can be clearly seen when vehicles are near the sensor 16. The Doppler chirps can also be clearly seen in the time-frequency plots for the higher speeds. At the slower speeds the Doppler chirps are harder to see because the vertical scale is compressed and the horizontal scale is expanded. Holding the paper at an angle to visually compress the horizontal scale makes it easier to see the slow speed chirps. There is significant cross-talk between channels due to the incomplete lane separation by the antennas. This adds a considerable amount of noise to the data but there is sufficient antenna pattern separation to make lane separation possible. The multi-path chirps are blotchy. The blotches are from variations in the radar cross section. The strongest blotch is near dc where the returns are strongest.

Figure 14:
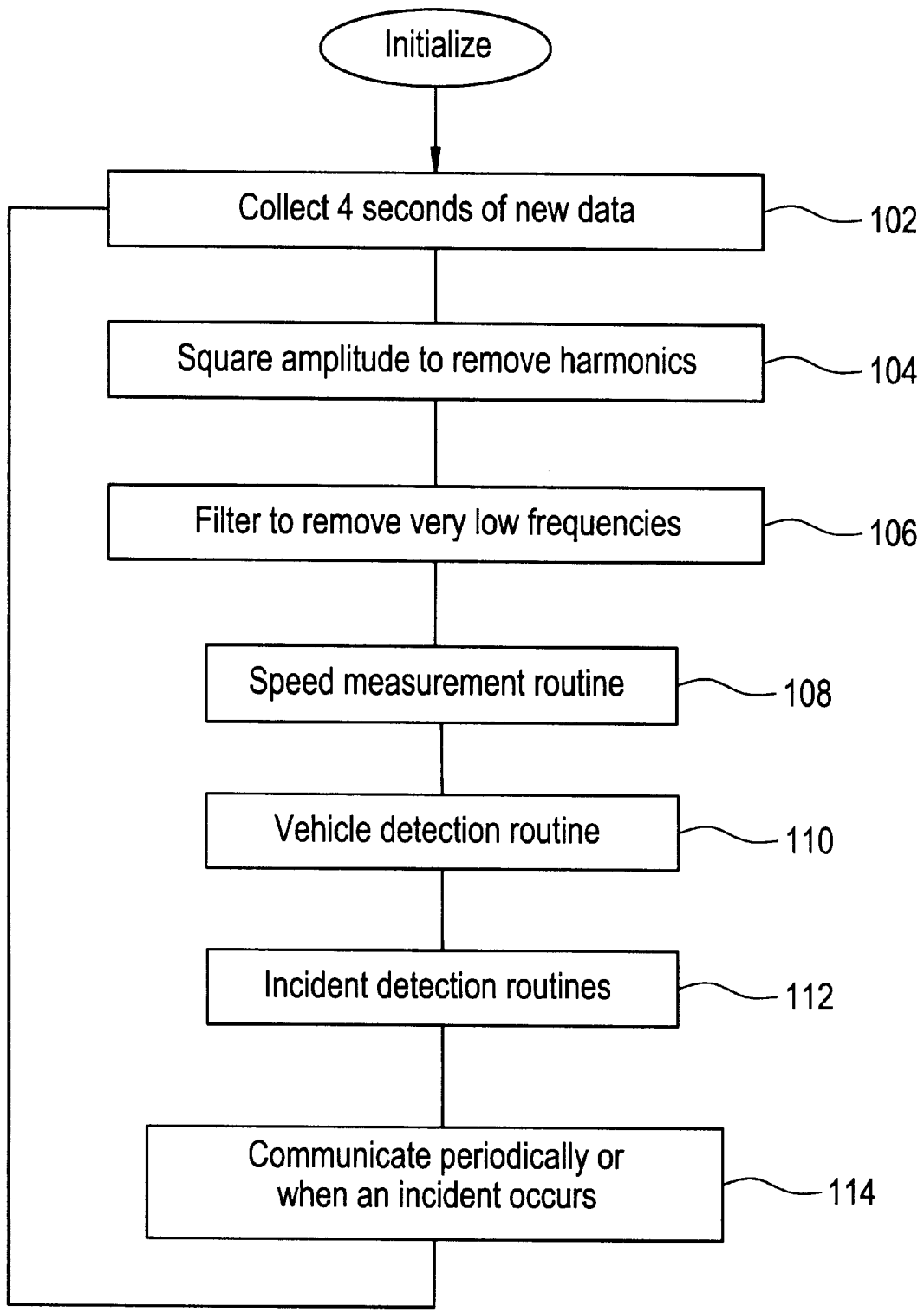
FIG. 14 is a flow chart of an example of a traffic sensor algorithm that can be used in the invention.
Figure 15A:
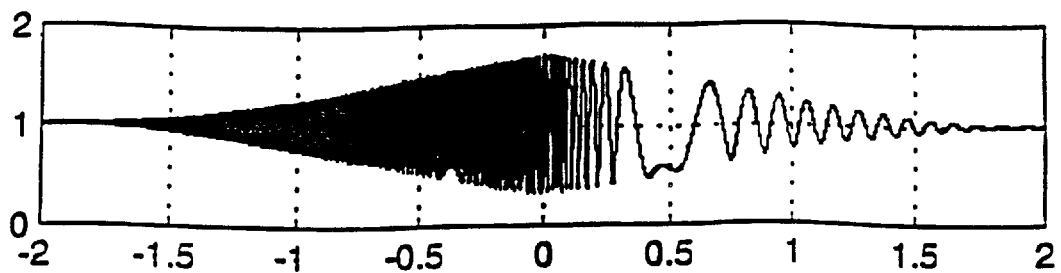
FIGS. 15A, 15B and 15C are graphs showing the top, center and lower curves, respectively, of the effects of a varying dc bias that occurs when a chirp pulse is squared.
Figure 15B:
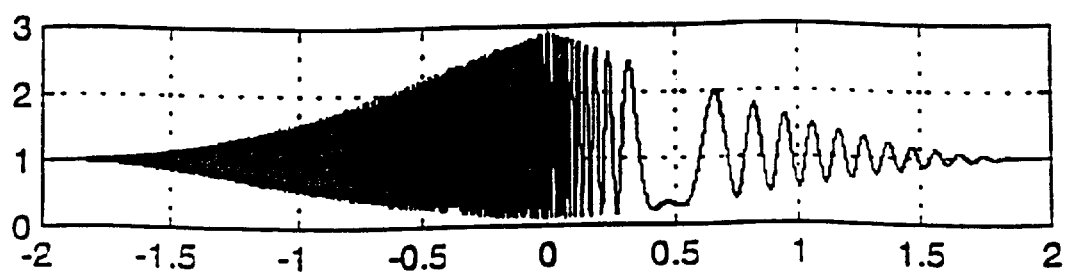
Figure 15C:
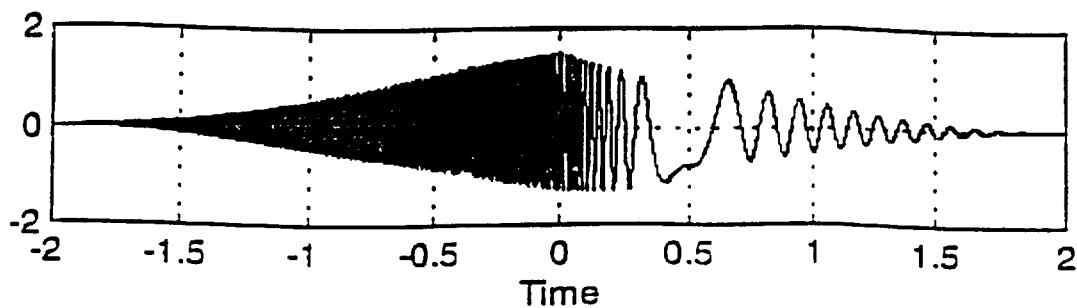

The operation of an example of a traffic sensor algorithm that can be used in the present invention is shown in the flow chart of FIG. 14. Four seconds of new data are processed in step 102. The amplitude of the new data is then squared to remove the Doppler harmonics in step 104 and as described earlier in the description of multi-path. A filter then removes some low frequency noise and a varying dc bias that occurs when the chirp pulse is squared in step 106. This varying bias is illustrated in FIGS. 15A–15C. FIG. 15A shows the amplitude of a Doppler chirp, showing the frequency variations seen in FIG. 2. The chirp has been windowed to simulate the effect of the antenna pattern. FIG. 15B shows the square of this amplitude. It can be seen that this curve now has a varying bias. FIG. 15C shows the effect of filtering with a highpass (2 pole Butterworth) filter.

Returning to FIG. 14, Step 108 runs a speed measurement routine on the filtered data. Step 110 runs a vehicle detection routine on the filtered data. Incident detection routines can then be run in step 112. The results are then recorded and forwarded to an interested party in step 114. The routine then goes back to step 102 to collect four seconds of new data. The routines in steps 108–114 can be any type of routine necessary to obtain the required information.

Several speed and vehicle detection algorithms were evaluated. Examples of preferred algorithms are described in the following two sections. Other algorithms are described in a later section. It should be noted that the invention is not limited to these algorithms and that any suitable algorithms can be used. A future prototype would simply record the speeds and vehicle detection for validation against a ground truth system. An operational traffic sensor 16 would need an incident detection routine and a means for communicating incident detection to a traffic management center.

An example of a speed measurement algorithm will now be given. Solving Equation (2) for vehicle speed gives:

$$v = \text{Max}[|SteadyStateDoppler|] \cdot \frac{\lambda}{1 + |\cos(\theta)|} \quad (3)$$

The wavelength $\lambda$ is known and $\cos(\phi)$ must be determined during initialization. The speed measurement algorithm must then find the maximum steady state Doppler to evaluate this equation for vehicle speed.

Figure 16:
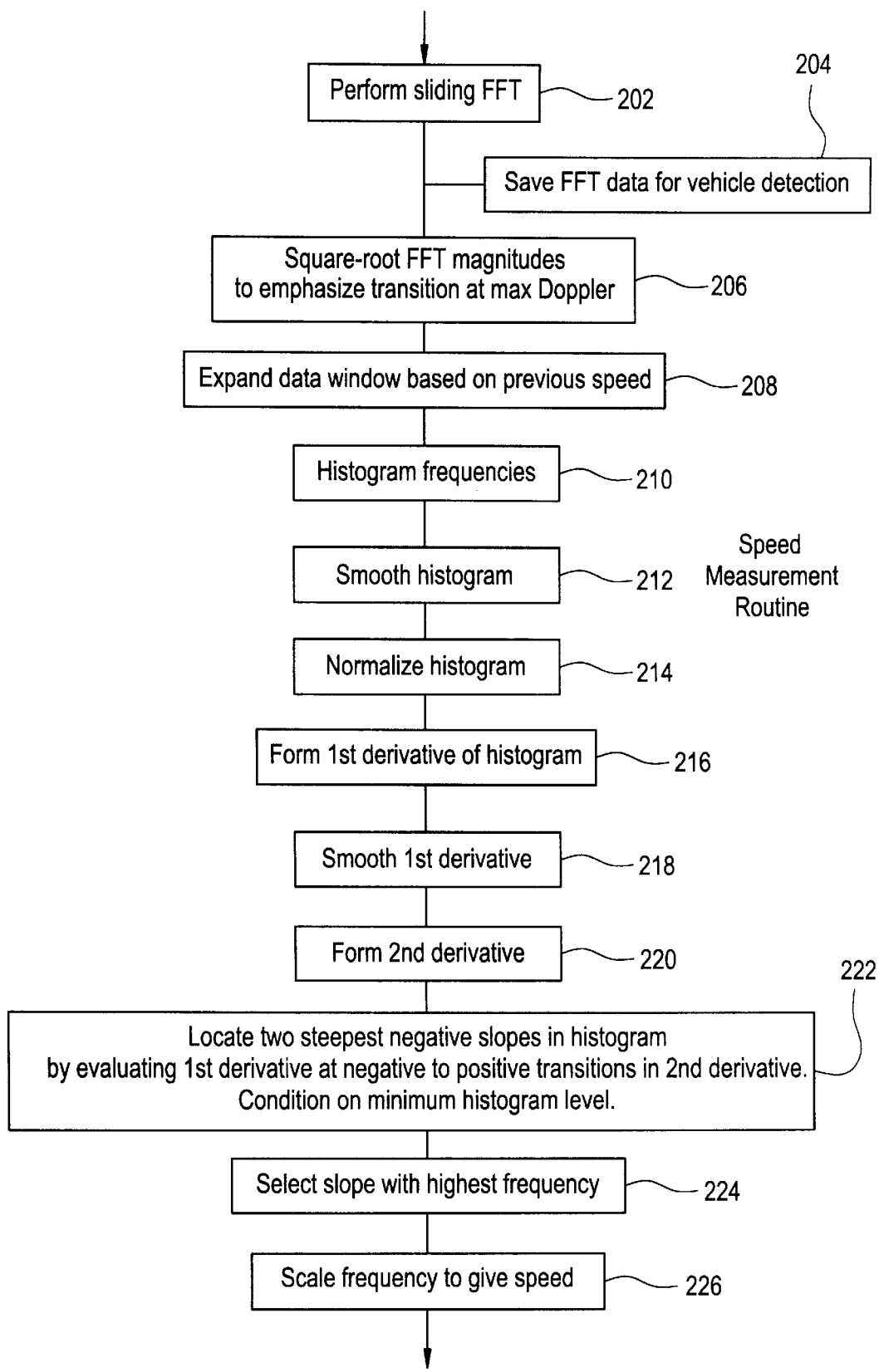
FIG. 16 is a flow chart of a speed measurement algorithm that can be used in the invention.

An example of a speed measurement routine that could be used in the present invention is shown in the flow chart of FIG. 16. The routine attempts to find the average speed of vehicles passing the sensor 16 during the window, not the speed of individual vehicles. The speeds of vehicles passing the sensor 16 are unlikely to change much during the window and there is no discernible need for higher resolution. It should be noted that many different types of routines can be used. A sliding FFT is performed first in step 202. This creates the basic time-frequency data which is saved for the vehicle detection routine in step 204. A square-root is then performed on the FFT magnitudes, from step 202, in step 206. The square-root makes it easier to find the maximum Doppler by emphasizing higher frequencies over lower frequencies.

Vehicle detection estimates are made on four seconds of data at a time. However, the maximum steady state Doppler for a vehicle 10 does not occur when the detections are made, but rather, before or after the detections are made depending on the shape of the Doppler chirp. The speed measurement window is thus expanded up to two seconds in step 208 to include the time when the maximum Doppler will occur.

Figure 17A:
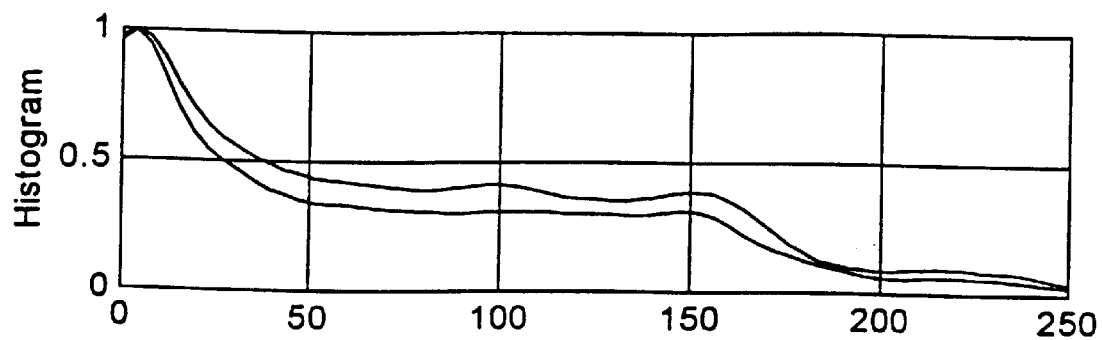
FIGS. 17A, 17B, 18A, 18B, 19A and 19B show intermediate results of the speed measurement algorithm for the data sets that are described in FIGS. 11, 12 and 13, respectively.
Figure 17B:
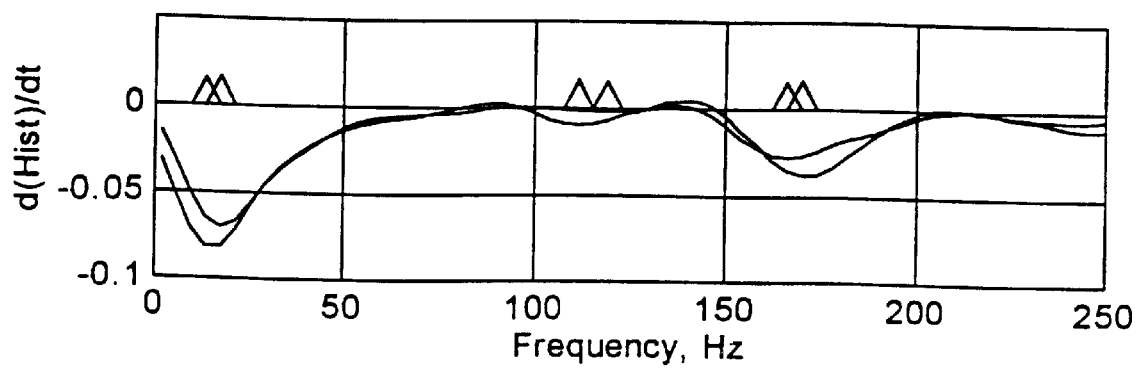
Figure 18A:
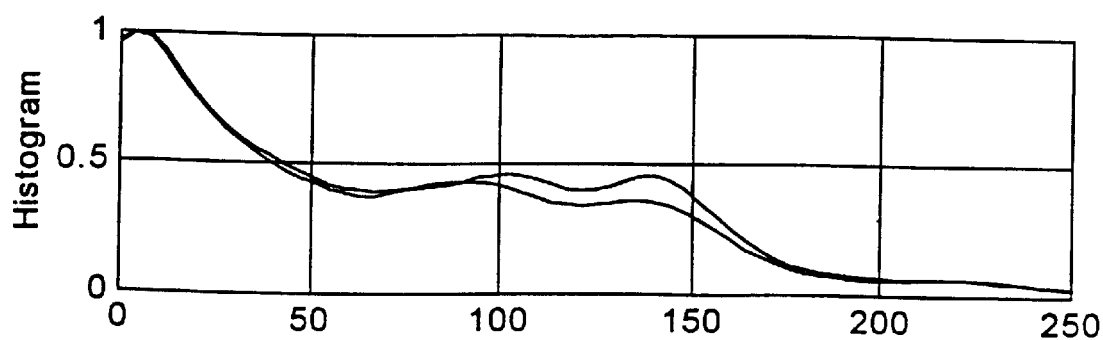
Figure 18B:
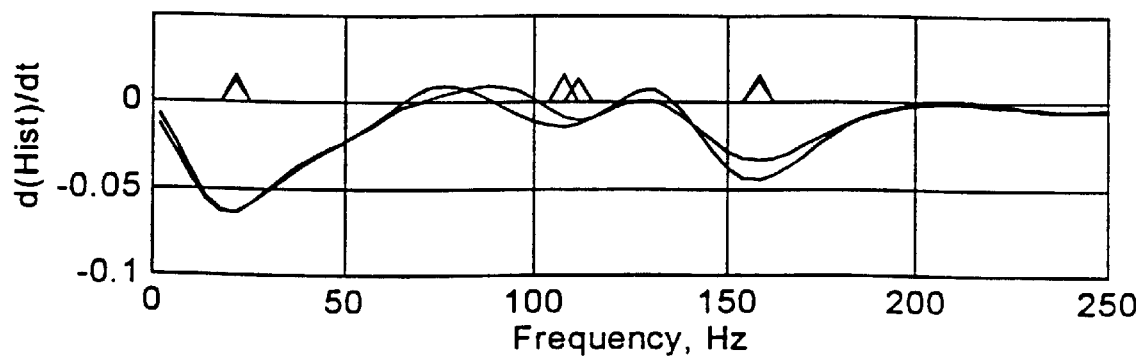
Figure 19A:
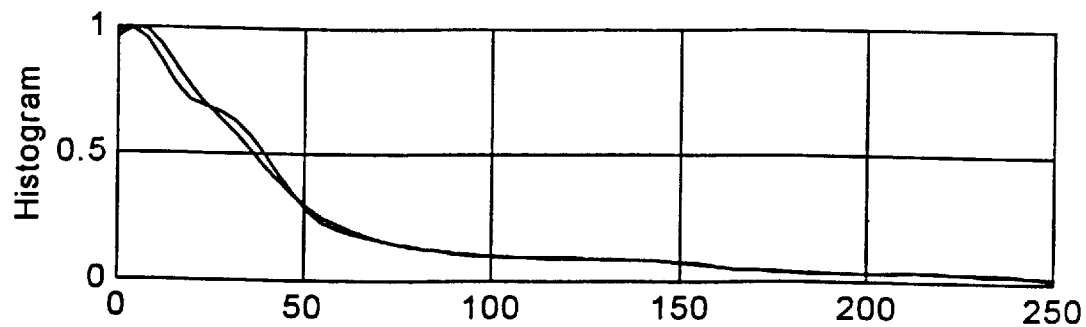

The time-frequency data is then histogramed in step 210 to remove time and leave the average frequency content. The histogram is them filtered and normalized in steps 212 and 214, respectively. Step 216 determines a first derivative of the histogram, the first derivative is then filtered in step 218 and a second derivative is determined in step 220. Intermediate results of the speed measurement algorithm are seen in FIGS. 17A, 17B, 18A, 18B, 19A and 19B for the three data sets that were described in FIGS. 11A–11D, 12A–12D, and 13A–13D. The curves in FIGS. 17A, 18A, and 19A show the filtered and normalized histograms. The large energy content at low frequency is from the lower steady state Doppler and the large return from the vehicle as it passes through zero Doppler. For FIGS. 17A and 18A the histogram levels out in the region of the changing Doppler chirp.

Figure 19B:
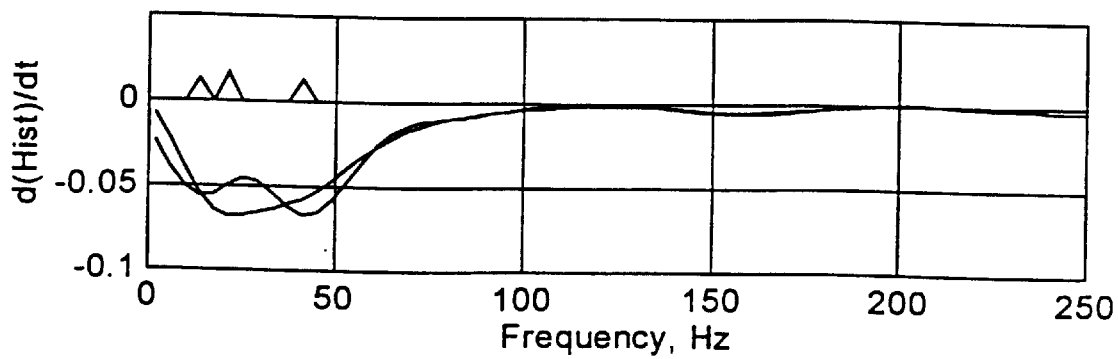

Near 150 Hz there is a slight bump and then a roll off as the maximum steady state Doppler is passed. It is this feature that the algorithm must find. The feature is found by first finding the two steepest negative slopes in the histogram which should correspond to the locations of the minimum and maximum steady state Doppler as shown in step 222 of FIG. 16. The slope with the highest frequency should be the maximum steady state Doppler and is selected in step 224. The steepest negative slopes are found by evaluating the $1^{st}$ derivative of the histogram at negative-to-positive transitions of the $2^{nd}$ derivative. The negative-to-positive transitions of the $2^{nd}$ derivative identify minima of the $1^{st}$ derivative, which is where the steepest negative slopes occur in the histogram. The set of curves in FIGS. 17B, 18B, and 19B show the $1^{st}$ derivative and the locations where the $2^{nd}$ derivative have a negative-to-positive transition.

The identification of negative-to-positive transitions is conditioned on the histogram having a minimum energy. This prevents noise at a higher frequency from giving an unwanted minima. For FIG. 19B the chirp region is compressed and the minimum and maximum steady state Doppler begin to blend into a single large feature. When this occurs, a single minima occurs in the $1^{st}$ derivative rather than an expected two minima. Without conditioning on a minimum histogram level, higher frequency noise could be identified as the maximum steady state Doppler. In FIGS. 19B such noise exists and is actually caused by vehicles in the south-bound lanes. Such noise also points out the need for directional antennas to reduce the returns from vehicles on other roads in the area.

After finding the maximum steady-state Doppler, the speed measurement algorithm determines the average vehicle speed in step 226 using, for example, Equation (3). The results for the three data sets are listed below in Table 2. Although an independent speed measurement was not available, the speeds are reasonable given the observed traffic conditions. The only likely error is in Channel 1, Data Set 3. Because the blending of the steady-state Dopplers created a smooth histogram instead of one with two bumps, the point of maximum slope is likely between the two steady-state Dopplers rather than on the maximum steady-state Doppler which would be preferable. A bias could be added in such cases.

TABLE 2

Speed Measurements for each Data Set

|  | Data Set 1 | Data Set 2 | Data Set 3 |
| --- | --- | --- | --- |
| Channel 1 (near lane) | 67 mph | 62 mph | 8 mph |
| Channel 0 (far lane) | 66 mph | 62 mph | 16 mph |

Figure 20:
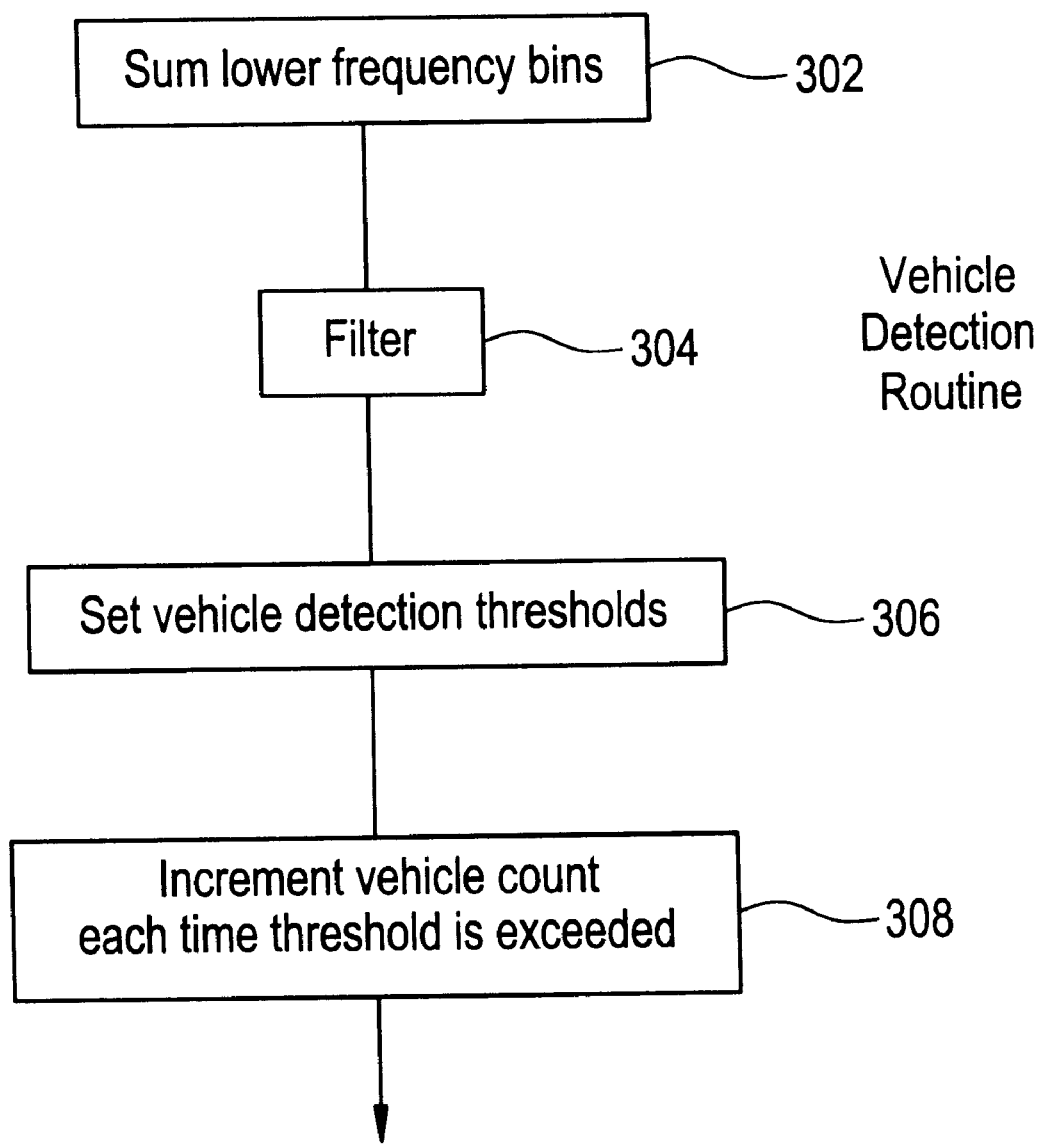
FIG. 20 is a flow chart of a vehicle detection algorithm that can be used in the invention.

An example of a vehicle detection algorithm that can be used is shown in the flow chart of FIG. 20. It looks for the large return that occurs when the Doppler chirp passes through zero. The FFTs performed in the speed measurement routine provide the necessary low frequency filtering. Several low frequency bins are summed together at each point in time in step 302 effectively forming a low-pass or band-pass filter followed by an energy detection. The summed outputs are then filtered in step 304 over time to smooth out the variations in the radar return from each vehicle 10. This filtering helps reduce the chances that the algorithm will incorrectly identify two returns from a single vehicle as two vehicles. Vehicle detection thresholds are set in step 306. The summed and filtered data is then compared to a threshold to determine if a vehicle 10 is present. If the threshold is exceeded, the vehicle count is incremented in step 308.

Figure 21A:
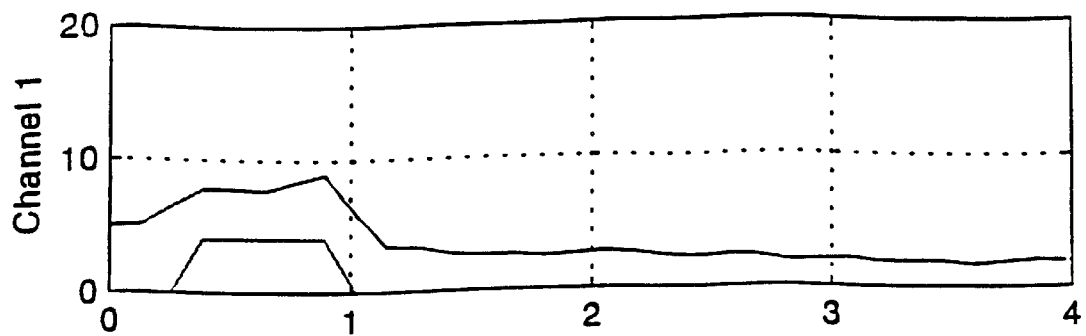
FIGS. 21A, 21B, 22A, 22B, 23A and 23B are graphs of the summed and filtered data sets for four seconds of data sets 1, 2 and 3, respectively.
Figure 21B:
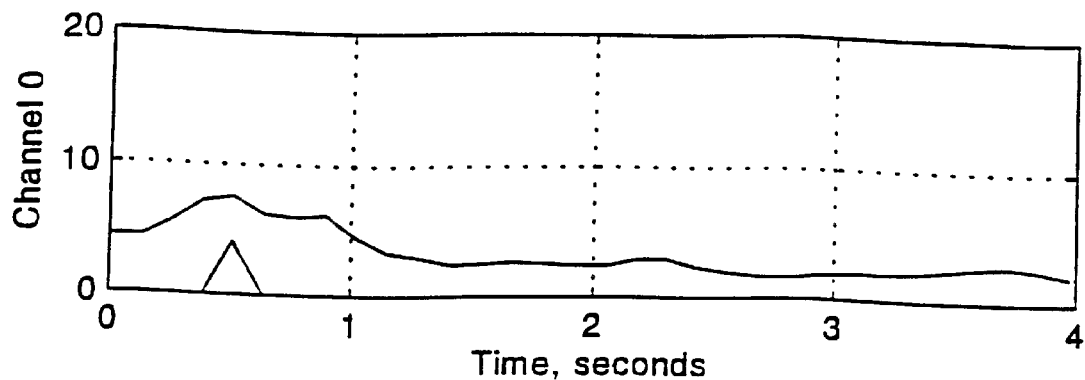
Figure 22A:
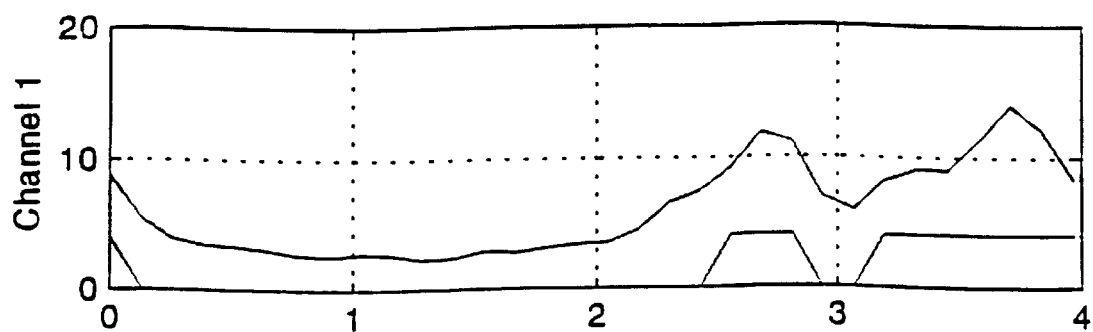
Figure 22B:
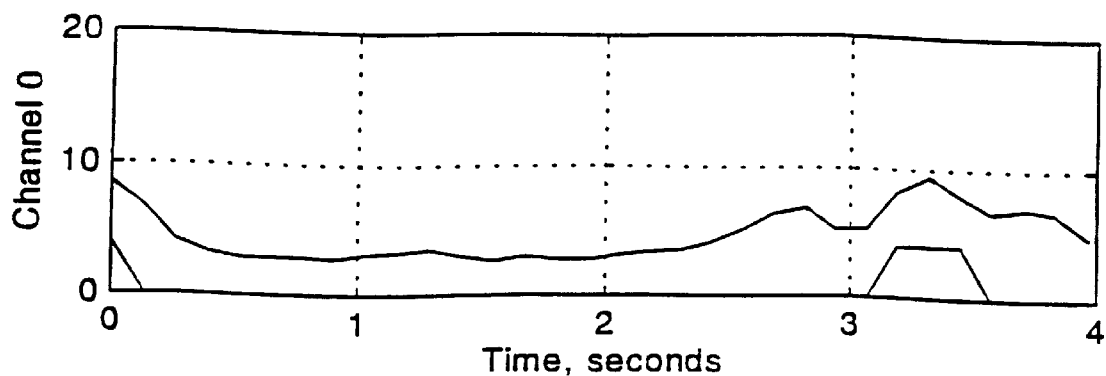
Figure 23A:
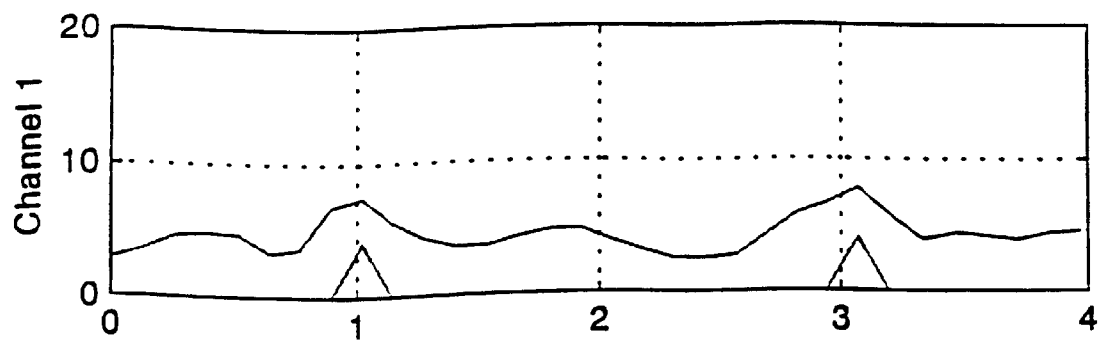
Figure 23B:
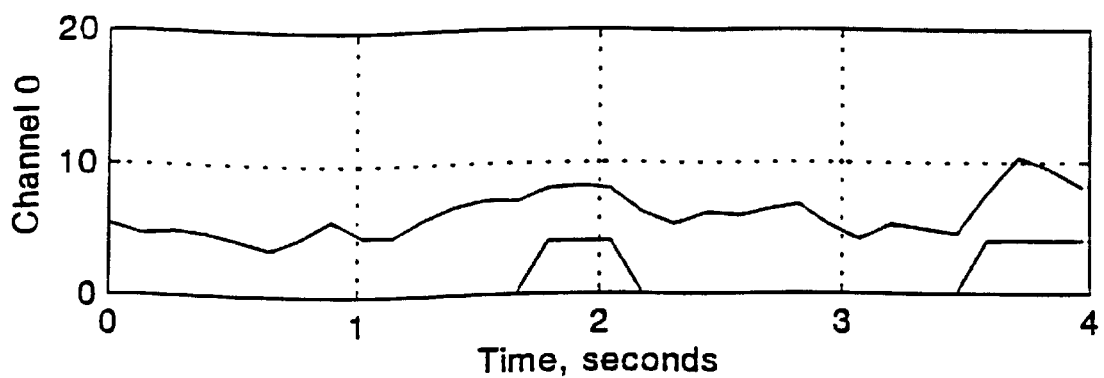

The summed and filtered data for the center four seconds of data sets 1, 2, and 3 are shown in FIGS. 21A, 21B, 22A, 22B, 23A and 23B. Detection curves showing when the threshold was exceeded are also shown. FIGS. 21A, 22A, and 23A are for channel 1 and FIGS. 21B, 22B and 23B are for channel 0. The ground truth data in FIGS. 11 through 13 show when vehicles pass directly in front of the sensor 16. The Doppler chirp passes through zero some time later. The offset in time depends on the vehicle's speed. Four seconds of data are taken from the center of each data set, so the corresponding ground truth data is then to the left. For data set 3 the shift is about 2 seconds. With this understanding, it can be seen that the above vehicle detection algorithm correctly detects the vehicles in these data sets.

Several alternate processing methods and algorithms were examined. They did not provide the results that the above algorithms did. A few examples follow.

A simple vehicle detection algorithm involves simply looking for an increase in amplitude modulation to indicate the presence of moving vehicles. When the traffic is very dense, the amplitude modulations are continuous. When an open space occurs, the modulations are significantly reduced. This algorithm can not attempt to count every vehicle since it does not separate closely spaced vehicles. But it can give an indication of the approximate density of vehicles by examining the amount of time significant amplitude modulation is present.

The simple vehicle detection algorithm is very similar to the one actually used but involves bandpass filtering the central region of the chirp transition. This is not practical in actual use because the variations in radar return require the filter to be wide while the slope of the chirp requires the filter to be narrow. In addition, geometries with φ near 90° would cause two pulses for each vehicle. Moving the filtered region to the low frequencies improves the chance of a good radar return and provides a single pulse for each vehicle without much concern for the particular geometry involved.

Wavelet transforms were examined as an alternative to FFTs but did not seem to be as effective.

In the same way the Fourier Transform correlates a complex sine wave with raw data, a template transform algorithm correlates a complex template of the chirp with raw data. If the vehicles were point reflectors, this would be the ideal detection method and could be used to measure speed and detect vehicles. However, the physical size of vehicles reduces the effectiveness of the template transform algorithm since different locations on the vehicle generate slightly different chirps. Although the template transform algorithm provides fairly good detection, the processing required does not make it a viable choice. In addition, implementation of the template transform algorithm does not include the zero Doppler area since it does not realize that the increase in energy is real and not just noise. An improved detection algorithm makes use of a truncated chirp just around the zero Doppler location. This would minimize the processing and may provide similar or better results than the FFT based technique.

The foregoing is considered as illustrative only of the principles of the invention. Further, since numerous modifications and changes will readily occur to those skilled in the art, it is not desired to limit the invention to the exact construction and applications shown and described. Accordingly, all suitable modifications and equivalents may be resorted to, falling within the scope of the invention and the appended claims and their equivalents.

We claim:

1. A system for measuring traffic speed and volume on a roadway, said system comprising:
   a preexisting radio signal source, emitting a constant amplitude radio signal;
   a vehicle reflecting said radio signal; and
   a sensor, located next to an area of vehicular movement, for receiving said radio signal along a direct path and said radio signal along a reflected path and analyzing a resulting interaction between said radio signals.

2. A system according to claim 1, wherein said sensor comprises:
   an antenna;
   a receiver;
   an analog to digital converter; and
   processing means for processing signals from the analog to digital converter.

3. A system according to claim 2, wherein said receiver is an amplitude modulation (AM) receiver acting as a bistatic radar receiver.

4. A system according to claim 1, wherein said preexisting signal source transmits constant amplitude RF signals.

5. A system according to claim 4, wherein said preexisting signal source comprises a cellular telephone base station.

6. A system according to claim 1, wherein said preexisting signal source is an audio portion of a UHF television station.

7. A method for measuring traffic speed and volume on a roadway, said method comprising the steps of:
   a) receiving, by a sensor, a direct signal, from a preexisting constant amplitude radio signal source along a direct propagation path;
   b) receiving, by the sensor, a reflected signal from the preexisting constant amplitude radio signal source along a reflected propagation path by way of a reflecting vehicle;
   c) determining traffic speed and volume using a received signal comprised of the direct signal and the reflected signal; and
   d) forwarding the traffic speed and volume information to a traffic management center.

8. A method for sensing traffic according to claim 7, wherein said step c) determines the speed by determining the rate of amplitude fluctuation of the received combination of the direct and reflected signals.

9. A method for sensing traffic according to claim 7, wherein said step c) determines the volume of vehicles by determining the magnitude of the amplitude fluctuations of the combination of the direct and reflected signals.

10. A system for measuring the speed and traffic volume on a roadway, said system comprising:
    a preexisting constant amplitude radio signal received along a direct propagation path;
    a vehicle, reflecting said constant amplitude radio signal along a reflected propagation path; and
    a sensor for receiving the constant amplitude radio signal along the direct propagation path and the reflected signal along the reflected propagation path and determining the traffic speed and volume.

* * * * *